Patented Jan. 27, 1942

2,271,410

UNITED STATES PATENT OFFICE 2,271,410

PHOSPHATIDIC COMPOSITION

Benjamin H. Thurman, Bronxville, N. Y., assignor to Refining, Inc., Reno, Nev., a corporation of Nevada No Drawing. Application December 29, 1939, Serial No. 311,707

13 Claims. (Cl. 260—403)

This invention relates to phosphatidic compositions, and more particularly to compositions of matter produced by treating phosphatides with salts of hydroxy acids.

In accordance with the present invention, it has been found that phosphatides and salts of hydroxy acids form compositions which have important new properties. The salts referred to have a hydroxy acid radical and an alkaline radical, which may comprise an alkali metal, an alkali earth metal, ammonia or an amine capable of reacting with organic acids to form salts. By hydroxy acid is meant an organic compound having an acid reaction and at least one free hydroxy group. Phosphatides are amphoteric and it is believed that the hydroxy group of the acid radical enables the salts to combine with the phosphatide radical of the phosphatides, but the chemistry is extremely complex, and applicant does not wish to be bound by any precise theory. The nature of the resultant product indicates that true chemical compounds are formed. That is to say, the resultant products exhibit physical and chemical evidence of being actual chemical compounds by every test I have employed.

Of the broad class of compounds or compositions referred to, those which appear to have the greatest utility at the present time result from treating phosphatides with alkali metal or ammonium salts of water soluble edible hydroxy acids. In addition to other desirable properties, such compounds are suitable for incorporation into food products as water retention agents and for increasing the sugar tolerance of baked products. For such purposes it is preferred to employ vegetable phosphatides which are free of linolenic acid radicals, the preferred phosphatide being corn phosphatide and the preferred salt being sodium lactate.

It is, therefore, an object of the present invention to provide a new phosphatide composition with salts of hydroxy acids.

Another object of the invention is to provide a new composition of matter resulting from treating vegetable phosphatides with edible water soluble hydroxy acids.

Another object of the invention is to provide a new composition of matter resulting from treating vegetable phosphatides free of linolenic acid radicals with ammonium or alkali metal salts of edible water soluble hydroxy acids.

Another object of the invention is to provide an improved edible phosphatidic composition capable of being incorporated into food products to increase water retention or the sugar tolerance of baked products.

Another object of the invention is to provide an improved phosphatidic composition resulting from treating vegetable phosphatides with alkali metal salts of edible water soluble hydroxy acids, which composition may be combined with shortening or margarine to produce products of the high sugar ratio type and non-spattering type.

Another object of the invention is to provide a process of producing phosphatidic compositions in which phosphatides are treated with salts of hydroxy acids.

A still further object of the invention is to provide a process of producing new phosphatidic compositions of vegetable phosphatides and edible water soluble hydroxy acids.

Other objects and advantages of the invention will appear from the following description of preferred embodiments thereof.

The preparation and properties of the preferred composition resulting from treating corn phosphatides with sodium lactate will first be described. As a specific example, 100 gr. of corn phosphatide is mixed with 29 gr. of a 70% aqueous solution of sodium lactate. The mixture is dehydrated under a vacuum of 29 inches of mercury, while stirring, at a temperature of 150 to 200° F. When substantially all of the water has been removed from the mixture, the resulting product is soluble in ether and in vegetable and mineral oils and disperses in water. It is a light colored resin, bland in taste, neutral (pH about 6.5), odorless and stable against rancidity or oxidation. If relatively pure materials are employed no further purification is necessary, although, if desired, the composition may be purified by extraction with petroleum ether or other solvent for the composition, and evaporating the solvent from the extract. Preferably a carrier, usually a vegetable oil such as corn, cotton, sesame, etc., is incorporated into the sodium lactate phosphatide composition in the final stages of drying or of solvent evaporation, if a solvent is employed to purify the composition.

In preparing the above composition, the temperature may vary within a wide range, for example from 70 to 250° F. Also, dehydration need not be carried out under vacuum, so that the vacuum may vary from zero to the highest vacuum commercially attainable. The lower the temperature and the lesser the amount of vacuum employed, the greater the time which will be required to dehydrate the product. The proportions given appear to be the optimum proportions, but the amount of water may vary widely. In general, sufficient water should be employed to dissolve the salt, although slurries may be used, while large amounts of water require more extensive dehydration treatment. Furthermore, the composition may contain excess of phosphatide or excess of salt while still retaining the desirable properties of the composition to a large degree. Thus, the percent of salt added may vary between 1 and 75% of the weight of the phosphatide. Furthermore, it is not essential that a previously prepared salt be employed. Thus, in the above example, sufficient lactic acid and sodium hydroxide or carbonate can be added to form the sodium lactate. If it is desired to vary the pH of the resulting product, excess alkali or excess lactic acid can be employed. The neutral or acidic compositions are more stable than alkaline compositions. For edible products, therefore, the pH of the composition should not ordinarily be substantially greater than 7 and is preferably between 5 and 6.8.

Other edible water soluble hydroxy acids can be employed to furnish the acid radical of the salt. Examples of such acids are glycollic, tartaric, malic, citric and gluconic acids. In general, any aliphatic hydroxy acid having a relatively low number of carbon atoms can be employed in combination with alkali to produce compositions having properties similar to the sodium lactate composition above described. Aliphatic hydroxy acids containing carbon atoms substantially in excess of 7 tend to become insoluble in water, and compositions containing radicals of such acids tend to lose their water dispersibility. However, hydroxy acid radicals having more than 7 carbon atoms will form compositions usable for many purposes, and such acids need not necessarily be aliphatic. Examples of other acids forming compositions in accordance with the present invention are salicylic acid, gallic acid, hydroxy butyric, hydroxy glutaric, etc. The compositions resulting from treating phosphatides with salts of such acids form powerful emulsifiers and many of them have certain specific properties providing utility for special purposes. For example, an alkali metal or ammonium salt of salicylic acid with phosphatides forms a water soluble composition useful as an analgesic.

Other alkali metals may replace sodium in the compositions above discussed, for example, potassium. Ammonia may also be employed, and, in general, the ammonium and alkali metal salts of hydroxy acids having a relatively small number of carbon atoms form compositions with phosphatides which disperse readily in water and are soluble in ether and in oils. Alkaline earth metals such as calcium also may form the alkali radical of the salt and produce, in combination with phosphatides, excellent emulsifiers for certain purposes, but in general such compositions do not have the desirable properties of the alkali metal and ammonium compositions.

For incorporation into food products, corn phosphatidic compositions are preferred, as they are light in color and free from linolenic acid, thus forming light colored substantially tasteless and odorless phosphatidic compositions which are stable against rancidity, oxidation, reversion, etc. Other linolenic free phosphatides may be employed, such as cottonseed, rape or peanut phosphatides if more darkly colored compositions, or in some instances compositions having a characteristic taste, are not objectionable. Even phosphatides containing linolenic acid radicals such as soya bean phosphatides and certain animal phosphatides, for example egg yolk phosphatides, may likewise be employed to form the compositions of the present invention, although in general such compositions are darker in color and not as stable as compositions formed from vegetable phosphatides which are free of linolenic acid radicals. However, the neutral and acidic compositions of the present invention, with soya bean and the other less stable phosphatides referred to, are much more stable than the original phosphatides. It is apparent that mixtures of different hydroxy acid radicals may be employed in combination with mixtures of various alkali radicals and that mixtures of various phosphatides may also be employed to produce compositions in accordance with the present invention.

The sodium lactate phosphatide composition of the preferred example is an edible emulsifier and acts as a hydroscopic agent. It forms a gelatinous dispersion in 5% concentration in water. There is no separation or extrusion of free water. In concentrations less than about 5%, the solution is homogeneous and no sediment or settling out of the composition occurs, even after prolonged standing. The composition is a light colored paste, and is not tacky. Very stable emulsions of oil and water are made by employing the composition as an emulsifier. As little as 0.1% is effective, and the normal range is ½ to 2%. In making such emulsions, the composition is preferably dissolved in the oil, the water then added and the mixture agitated. However, smooth stable emulsions of vegetable, mineral and essential oils with water are obtained when 0.1 to 5% of this composition is added to either the water or oil phase, and the resulting mixture agitated.

Because of its neutral character, the composition can be blended with ingredients of soaps, salves, ointments, face creams, suppositories, shaving creams either ordinary or brushless, insecticidal emulsions, nose drops, nose sprays, ephedrine nasal preparations, pine oil emulsions or flotation compounds, etc. The composition also finds utility as a pigment dispersing agent for oil paints and as an emulsifier for casein paints in which the composition also acts as a softener of the film. When incorporated into gelatin, the latter is soft and pliable. As an ingredient in gelatin, cornstarch, chocolate desserts, etc., it performs the functions of increasing their rapid dispersibility, and when dry it helps them to remain soft and prevents caking and hardening. It is an anti-oxidant and also acts as an anti-reversion agent for soya bean oil or soya bean oil products, or for other oils containing linolenic or equivalent acid radicals such as fish or fish liver oils. It also improves the keeping qualities of the more saturated oils or fats such as corn or cottonseed oils, margarines, or shortenings. It forms stable emulsions of orthodichlorobenzene in water, which emulsions are used as insecticides and weed killers. When added to mixtures of sulfonated oil and orthodichlorobenzene, the composition enhances the emulsifiability of these mixtures. The composition is soluble in orthodichlorobenzene and may be added to this material for use alone or with sulfonated oil. It is also useful as a surface tension reducing agent for textile treatment. Because of its ability to retain moisture, the composition is also suitable for use in tobacco to prevent drying and loss of flavor thereof.

The preferred compositions of the present invention are perhaps of greatest utility in margarine. The composition increases the amount of water which is retained by the margarine, and this additional water over that which is retained when the composition is not present is held very firmly even at 212° F. The amount of this composition added will range from 0.1 to 5% based on the weight of the oil or fat in the margarine and the normal amount is approximately .3 to .4%. Because it is bland and light in color, it does not affect the odor, color and flavor of the margarine. The preferred manner of incorporating the composition into margarine is to first mix it with the oil or fat. The resulting mixture is suitable for use in the manufacture of margarine by the known methods, among which are the chill vat, chill roll and continuous methods.

The margarine manufactured with this composition has superior characteristics, among which are: (1) smoother and better emulsions in the churn; (2) smoother product; (3) greater adaptability for incorporation of color; (4) marked decrease in sweating, permitting the packing of margarine in weights more closely approximating the actual standard weights, thereby reducing the "overweight" now necessary; (5) drier packages which are neater because of the elimination of normal sweating, which results in salt stains on the package; (6) greater spreadability, particularly in coconut oil margarines; (7) increase in temperature range within which the margarine is plastic, i. e. retaining plasticity at both lower and higher temperatures; (8) retention of larger amounts of milk solids and salt, making waste in manufacture from this source negligible; (9) more butter-like appearance and consistency; (10) greater adaptability for frying because spattering is reduced and eggs or other material are prevented from adhering or sticking to the cooking surfaces; (11) permits the use of margarine containing the composition of the present invention as a high ratio shortening.

The high ratio effect above mentioned with respect to margarine may also be obtained in substantially dry fats such as the usual shortenings by the addition of the preferred composition of the present invention in amounts between 0.25 and 5%. The usual range, however, for providing optimum high ratio characteristics will usually range between 1.5 and 2.5% in both margarine and shortenings on the basis of the oil or fat present. Such shortenings, or the margarine when used as a shortening, produce cakes of improved texture and volume in the presence of sugar-to-flour ratios greater than 1.

The sodium lactate-corn phosphatide composition is preferred for employment in margarine and shortening because of its light color, stability, neutral reactions, etc. However, it is to be understood that compositions of other vegetable phosphatides, even including the soya phosphatide, may be employed in a similar manner and in substantially similar proportions either in combination with sodium lactate or other alkali metal or ammonium salts of water soluble edible hydroxy acids. These compositions may be also employed for other purposes mentioned in the present application and for certain of such other purposes the compositions including alkali earth metal salts of hydroxy acids in general are suitable.

While, for the want of a better term, I have herein referred to my new chemical compounds as "phosphatidic compounds," it is nevertheless to be understood that the same are fundamentally dissimilar in composition, behavior and utility to the usual soy bean lecithin of commerce.

This application is a continuation in part of my copending application Serial No. 290,083, filed August 14, 1939.

While I have disclosed the preferred embodiments of my invention, it is understood that the details thereof may be varied within the scope of the following claims.

I claim:

1. As a product of manufacture, a composition of matter comprising a compound formed by reacting a phosphatide and a solution of an aliphatic hydroxy acid.

2. As a product of manufacture, the composition of matter resulting from reacting vegetable phosphatides with salts of aliphatic hydroxy acids.

3. As a product of manufacture, suitable for incorporation into edible products as an emulsifier and anti-oxidant, a composition of matter comprising a compound of vegetable phosphatides with salts of water soluble edible aliphatic hydroxy acids.

4. As a product of manufacture, a composition of matter suitable for incorporation into edible products as an anti-oxidant, which comprises, a compound formed by reacting a vegetable phosphatide free of linolenic acid and a salt of a hydroxy acid selected from the group consisting of alkali metal and ammonium salts of edible water soluble aliphatic hydroxy acids.

5. As a product of manufacture, a phosphatidic compound resulting from the reaction between a vegetable phosphatide and a salt of an edible water soluble aliphatic hydroxy acid.

6. As a product of manufacture, a phosphatidic compound resulting from the reaction between a vegetable phosphatide and an alkali metal salt of an edible water soluble aliphatic hydroxy acid.

7. As a product of manufacture, a phosphatidic compound resulting from the reaction between a vegetable phosphatide free of fatty acid radicals of greater unsaturation than linoleic acid and an alkali metal salt of an edible water soluble aliphatic hydroxy acid.

8. As a product of manufacture, a phosphatidic compound resulting from the reaction between a vegetable phosphatide and sodium lactate.

9. As a product of manufacture, a phosphatidic compound resulting from the reaction between a vegetable phosphatide and sodium citrate.

10. As a product of manufacture, a phosphatidic compound resulting from the reaction between a vegetable phosphatide and sodium tartrate.

11. The process of producing phosphatidic compounds with salts of hydroxy acids which comprises reacting a mixture of a phosphatide with a salt of an aliphatic hydroxy acid in the presence of water, and dehydrating the resulting product.

12. The process of producing phosphatidic compounds with salts of aliphatic hydroxy acids which comprises heating a mixture of an alkali metal salt of an edible water soluble aliphatic hydroxy acid and a phosphatide in the presence of water so as to react said salt with said phosphatide, and dehydrating the reaction products.

13. The process of producing phosphatidic compounds with salts of aliphatic hydroxy acids which comprises reacting a mixture of a phosphatide with a salt of an aliphatic hydroxy acid in the presence of water, dehydrating the resulting product, extracting said compound from said reaction mass with a solvent therefor, and evaporating said solvent from said compound.

BENJAMIN H. THURMAN.